F. MANNING.
PLOW BEAM.
APPLICATION FILED JULY 10, 1919.
1,331,446. Patented Feb. 17, 1920.
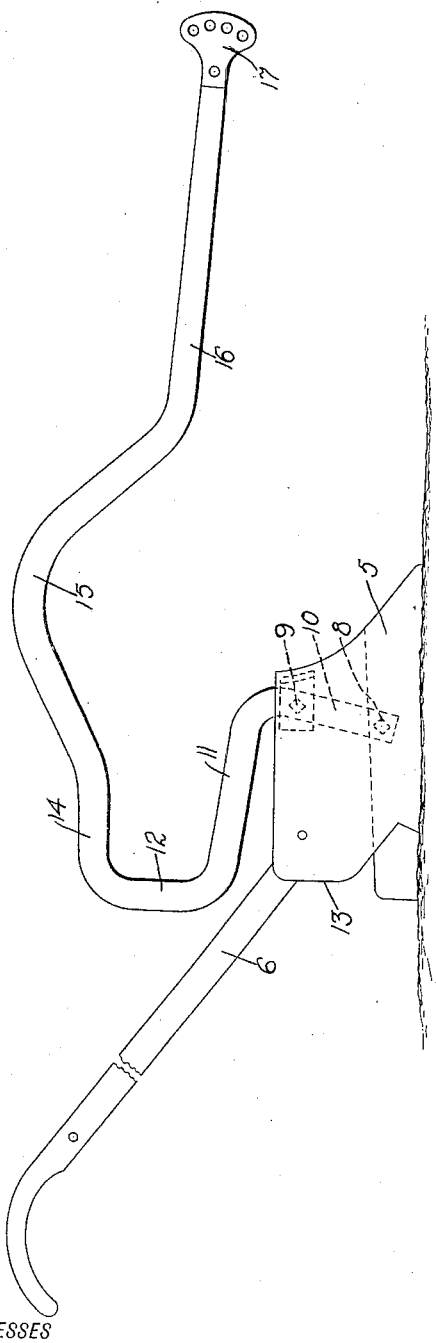
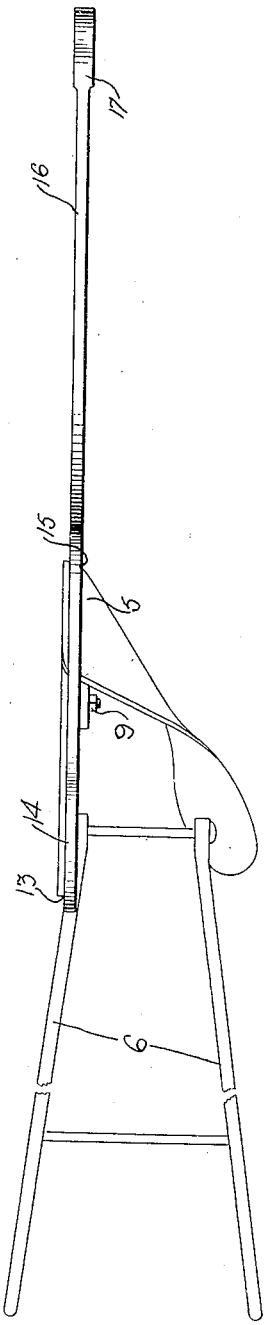
WITNESSES
H. T. Walker
P. H. Pattison
INVENTOR
F. MANNING
BY
ATTORNEYS

UNITED STATES PATENT OFFICE.

FERDINAND MANNING, OF GENESEO, KANSAS.

PLOW-BEAM.

1,331,446.  Specification of Letters Patent.  Patented Feb. 17, 1920.

Application filed July 10, 1919. Serial No. 309,867.

*To all whom it may concern:*

Be it known that I, FERDINAND MANNING, a citizen of the United States, and a resident of Geneseo, in the county of Rice and State of Kansas, have invented a new and Improved Plow-Beam, of which the following is a full, clear, and exact description.

The present invention relates to new and useful improvements in agricultural implements, and it pertains more particularly to the specific construction of plows and their beams.

The great disadvantage of plow beams as ordinarily constructed is the choking up of the beam with trash in plowing fields where trash is present, and it is the object of the present invention to construct a plow beam in such a manner that this disadvantage is entirely obviated.

It is a further object of the invention to construct a plow beam in such a manner that the same may be materially shortened, thus reducing the work attendant the plowing operation.

With the above and other objects in view, reference is had to the accompanying drawings in which Figure 1 is a side elevation of a plow constructed in accordance with the present invention;

Fig. 2 is a top plan view thereof.

Referring more specifically to the drawings, the reference character 5 designates the plowshare, the handles of the plow being designated by the reference character 6. The beam 7 of the plow is secured to the rear face thereof by means of the bolts 8 and 9, as shown in dotted lines in Fig. 1, and that part of the beam which engages the plowshare 5 projects upwardly and slightly forwardly as indicated by the reference character 10. From the forwardly and upwardly bent portion 10, the plow beam extends rearwardly in a slightly inclined horizontal plane as indicated by the reference character 11, and said rearwardly extending portion 11 terminates in a relatively short vertical portion 12, which overlies the rear vertical edge 13 of the plowshare 5. From the vertical portion 12, the beam projects forwardly in a horizontal plane, as designated by the reference character 14, and extending forwardly of the horizontal portion 14, the beam is curved upwardly as at 15, and terminates in a forwardly projecting end portion 16, which lies in a horizontal plane slightly below the plane occupied by the horizontal portion 14. The free end of the portion 16 is provided with the usual fitting 17 by means of which a clevis may be adjustably attached.

By such a construction it will be readily apparent that the curved portion of the beam permits of plenty of room for weeds, brush, stubble, &c., to freely pass over the upper edge of the plowshare, and the rearwardly projected portion 11 of the beam prevents any choking of the beam at its point of connection with the plowshare.

Having thus described the invention, what is claimed is:

1. A plow beam having a vertically disposed body portion terminating in a rearwardly projecting horizontal portion terminating at a point over the rear edge of the plowshare, a vertical portion, and a forwardly projected horizontal portion, said forwardly projected horizontal portion being curved upwardly intermediate of its ends.

2. In a plow, in combination with the share, a beam formed of an integral structure, said beam having a vertical portion to provide for its attachment to the share, said vertical portion terminating in a rearwardly and upwardly inclined portion terminating at a point substantially at the rear end of the share, a second vertical portion integral with the rear end of the rearwardly and upwardly inclined portion, and a forwardly projected portion, said forwardly projected portion being curved upwardly intermediate of its ends at a point overlying the cutting edge of the plow share.

FERDINAND MANNING.